United States Patent Office 3,471,436
Patented Oct. 7, 1969

3,471,436
S,S-DIALKYL-N-[p-(SUBSTITUTED)-PHENYL-SULFONYL]-SULFILIMINES
Guy Robert Collins, Walnut Creek, Calif., assignor to The Dow Chemical Company, Midland, Mich., a corporation of Delaware
No Drawing. Filed Dec. 27, 1966, Ser. No. 604,572
Int. Cl. C07c *143/80;* A01n *9/16*
U.S. Cl. 260—397.7                                                     4 Claims

ABSTRACT OF THE DISCLOSURE

S,S,-dialkyl-N-(p-aminophenylsulfonyl)-sulfilimines and S,S-dialkyl - N - [p-(sulfinylamino)-phenylsulfonyl]-sulfilimines which are useful as pesticides for the control of plants and bacteria, and a method of preparing them from $N^1,N^4$-disulfinylsulfanilamide and a dialkyl sulfoxide.

---

This invention is concerned with novel substituted sulfilimines and is particularly directed to S,S-dialkyl-N-[p-(substituted)-phenylsulfonyl]-sulfilimines corresponding to the formula:

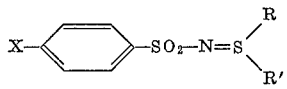

In the present specification and claims, R and R' each independently represent a lower alkyl group containing from 1, to 2, to 3, to 4 carbon atoms, inclusive, and X represents an amino group or a sulfinylamino group. The novel substituted sulfilimines are crystalline solids which are of varying degrees of solubility in a variety of organic solvents such as acetone and benzene and slightly soluble in water. For example, the compounds wherein X is sulfinylamino are soluble in non-polar organic solvents such as benzene, toluene, xylene and phenetole, while the compounds wherein X is amino are only slightly soluble in such organic solvents. When X is sulfinylamino, the compounds are hydrolyzed in polar solvents such as alcohols and water to form the corresponding sulfilimine in which X is amino. The novel compounds have been found to be useful as pesticides for the control of such representative organisms as plants and bacteria. The compounds in which X is amino have been found to be particularly useful as bactericides.

The novel sulfilimines are prepared by the reaction of $N^1,N^4$-disulfinylsulfanilamide wtih a dialkyl sulfoxide such as dimethyl sulfoxide, diethyl sulfoxide, dipropyl sulfoxide and dibutyl sulfoxide. The reaction proceeds when the reagents are contacted and mixed. An excess of the dialkyl sulfoxide can be employed as a reaction medium; however, the reaction is preferably carried out in the presence of an anhydrous, inert, non-polar organic solvent as a reaction medium. Representative and suitable organic solvents which can be employed as reaction media include benzene, toluene, xylene and phenetole. The reaction proceeds at temperatures from about 20° to 100° C., and is conveniently carried out at about 25° C. The reaction proceeds with the evolution of heat and sulfur dioxide of reaction. During the reaction, a mixture of the sulfilimine product corresponding to the above formula wherein X is amino and the sulfilimine product corresponding to the above formula wherein X is sulfinylamino precipitates from the reaction mixture. The precipitated products can be seperated from the reaction mixture by such conventional procedures as filtration, decantation and centrifugation. The mixture of the solid products is then separated by conventional methods such as extraction with a non-polar organic solvent such as benzene, toluene, xylene or phenetole. The insoluble substituted (p-aminophenylsulfonyl)-sulfilimine product can be purified by such conventional methods as recrystallization. The soluble substituted [p-(sulfinylamino) - phenylsulfonyl] - sulfilimine product can be separated from the extraction solvent by conventional methods such as evaporation or concentration and chilling and can be purified by such conventional procedures as recrystallization from a suitable non-polar organic solvent. The substituted [p-(sulfinylamino)-phenylsulfonyl]-sulfilimine product can be hydrolyzed and converted to the corresponding substituted (p-aminophenylsulfonyl)-sulfilimine by crystallization from a polar solvent such as methanol, ethanol, propanol or water. The substituted (p-aminophenylsulfonyl)-sulfilimine product can be employed in pesticidal operations or it can be further purified by such conventional methods as recrystallization.

In the preparation of the novel substituted sulfilimines of the invention, $N^1,N^4$-disulfinylsulfanilamide is mixed with an anhydrous dialkyl sulfoxide. In a convenient procedure, the reactants are mixed in a non-polar inert organic solvent such as anhydrous benzene as a reaction medium. The proportions of the reactants to be employed are not critical, some of the desired products being obtained when the reactants are mixed in any proportions. However, the reaction consumes the reactants in equimolar proportions, and the use of the reactants in such proportions is desirable, the use of an excess of the dialkyl sulfoxide being preferred. The reactants and the inert non-polar organic reaction medium are preferably mixed in a well-ventilated hood to provide for the removal of sulfur dioxide of reaction. The reaction mixture is allowed to stand at the reaction temperature for a short period of time, preferably about one hour, during which time the mixture of products precipitates. The mixture of products is then separated from the reaction mixture. In a convenient procedure, the reaction mixture is filtered and the mixture of products is collected as the filter cake. The filter cake is then extracted with boiling benzene and the hot benzene mixture is filtered, the filtrate being reserved. The substituted (p-aminophenylsulfonyl)-sulfilimine product is obtained as the filter cake. In a convenient procedure, the substituted [p-(sulfinylamino)-phenylsulfonyl]-sulfilimine product is separated from the reserved extraction solvent filtrate by chilling the filtrate to precipitate the product. The product can then be separated by conventional procedures such as filtration, centrifugation or decantation. The product prepared and separated as described above can be employed in herbicidal and bactericidal operations, or can be further purified by conventional procedures such as recrystallization from appropriate organic solvents. Alternatively, the substituted [p-(sulfinylamino)-phenylsulfonyl]-sulfilimine product can be converted to the substituted (p-aminophenylsulfonyl) - sulfilimine product by crystallization from a polar solvent such as ethanol.

The $N^1,N^4$-disulfinylsulfanilamide employed as a starting material herein is prepared by the reaction of sulfanilamide with an excess of thionyl chloride. The reaction proceeds when the reactants are contacted and mixed together with an inert organic solvent. In a convenient procedure, the reactants and the organic solvent are mixed together and heated at the boiling point under reflux for a period of about 36 hours. The $N^1,N^4$-disulfinylsulfanilamide product is separated from the reaction mixture by conventional procedures such as evaporation. The product separated as described above can be employed as a starting material in preparing the substituted sulfilimines of the invention.

The following examples illustrate the invention but are not to be construed as limiting the same.

EXAMPLE 1

Preparation of $N^1,N^4$-disulfinylsulfanilamide

Thionyl chloride (165 grams; 1.38 moles) was mixed with a solution of sulfanilamide (51.8 grams; 0.3 mole) in 100 milliliters of anhydrous benzene. The resulting mixture was heated at the boiling point under reflux for about 36 hours, during which time the solid material dissolved. The reaction mixture was then evaporated under reduced pressure and the $N^1,N^4$-disulfinylsulfanilamide product was collected as an oily residue.

EXAMPLE 2

Preparation of S,S-dimethyl-N-(p-aminophenylsulfonyl)-sulfilimine 22.5 grams (0.08 mole) of the $N^1,N^4$-disulfinylsulfanilamide of Example 1 was dissolved in 150 milliliters of anhydrous benzene. Dimethyl sulfoxide (7.8 grams; 0.1 mole) was added to the solution. The mixture was agitated, whereupon a heavy yellow precipitate formed, accompanied by the evolution of heat and sulfur dioxide. The mixture was allowed to stand at room temperature for about one hour, after which it was filtered and the filter cake was washed with cold benzene. The filter cake was mixed with 250 milliliters of boiling benzene and the mixture was filtered while still hot, the filtrate being reserved. The filter cake was recrystallized from a mixture of 95 percent ethanol and 5 percent tetrachloroethylene. The recrystallized S,S-dimethyl-N-(p-aminophenylsulfonyl)-sulfilimine product was found to melt at 176°–178° C. and was found, by analysis, to have carbon and hydrogen contents of 41.41 and 5.10 percent, respectively, as compared with the theoretical contents of 41.36 and 5.21 percent, respectively, calculated for the named structure.

EXAMPLE 3

Preparation of S,S-dimethyl-N-[p-(sulfinylamino)-phenylsulfonyl-sulfilimine

The benezene filtrate reserved from Example 2 was cooled to about 40° C. whereupon a yellow precipitate formed. The mixture was filtered and the precipitate collected as the filter cake. The filter cake was dried and the S,S-dimethyl-N-[p-(sulfinylamino) - phenylsulfonyl]-sulfilimine product was found to melt at 124°–126° C. The product was found, by analysis, to have carbon, hydrogen and nitrogen contents of 34.45, 3.58 and 10.00 percent, respectively, as compared with the theoretical contents of 34.39, 3.63 and 10.06 percent, respectively, calculated for the named structure.

EXAMPLE 4

Preparation of S,S-dialkyl-N-(p-aminophenylsulfonyl)-sulfilimines

In substantially the same procedure as Example 2, employing $N^1,N^4$-disulfinylsulfanilamide prepared as in Example 1, a similar inert non-polar organic solvent and a dialkyl sulfoxide, the following S,S-dialkyl-N-(p-aminophenylsulfonyl)-sulfilimines are prepared.

S,S-diethyl-N-(p-aminophenylsulfonyl)-sulfilimine, having a molecular weight of 260.4, is prepared by mixing together one molar proportion of $N^1,N^4$-disulfinylsulfanilamide with an excess of diethyl sulfoxide and an inert organic solvent, separating the resulting precipitate by filtration, mixing the filter cake with boiling benzene, filtering the hot mixture and collecting the product as a filter cake, the filtrate being reserved.

S,S-dibutyl-N-(p-aminophenylsulfonyl)-sulfilimine, having a molecular weight of 316.5, is prepared by mixing together one molar proportion of $N^1,N^4$-disulfinylsulfanilamide with an excess of dipropyl sulfoxide and an inert non-polar organic solvent, separating the resulting precipitate by filtration, mixing the filter cake with boiling benzene, filtering the hot mixture and collecting the product as a filter cake, the filtrate being reserved.

S,S - dibutyl-N-(p-aminophenylsulfonyl) - sulfilimine, having a molecular weight of 316.5, is prepared by mixing together one molar proportion of $N^1,N^4$-disulfinylsulfanilamide with an excess of dibutyl sulfoxide and an inert non-polar organic solvent, separating the resulting precipitate by filtration, mixing the filter cake with boiling benzene, filtering the hot mixture and collecting the product as a filter cake, the filtrate being reserved.

EXAMPLE 5

Preparation of S,S-dialkyl-N-[p-(sulfinylamino)-phenylsulfonyl]-sulfilimines

In substantially the same procedure as described above in Example 3, and employing the filtrates reserved from Example 4, the following S,S-dialkyl-N-[p-(sulfinylamino)-phenylsulfonyl]-sulfilimines are prepared.

S,S - diethyl-N-[p-(sulfinylamino)-phenylsulfonyl]-sulfilimine, having a molecular weight of 306.4, is prepared by cooling the benzene filtrate obtained from the preparation of S,S-diethyl-N-(p-aminophenylsulfonyl)-sulfilimine by reaction of $N^1,N^4$-disulfinylsulfanilamide with diethyl sulfoxide in Example 4, filtering the cooled benzene filtrate and collecting the product as a filter cake.

S,S-dipropyl- N - [p-(sulfinylamino)-phenylsulfonyl]-sulfilimine, having a molecular weight of 334.5, is prepared by cooling the benzene filtrate reserved from the preparation of S,S-dipropyl-N-(p-aminophenylsulfonyl)-sulfilimine by reaction of $N^1,N^4$-disulfinylsulfanilamide with dipropyl sulfoxide in Example 4, filtering the cooled benzene filtrate and collecting the product as a filter cake.

S,S-dibutyl - N - [p - (sulfinylamino)-phenylsulfonyl]-sulfilimine, having a molecular weight of 362.5, is prepared by cooling the benzene filtrate reserved from the preparation of S,S-dibutyl-N-(p-aminophenylsulfonyl)-sulfilimine by reaction of $N^1,N^4$-disulfinylsulfanilamide with dibutyl sulfoxide in Example 4, filtering the cooled benzene filtrate and collecting the product as a filter cake.

The substituted sulfilimine compounds of the invention can be employed as herbicides. In representative operations, excellent control of soybeans and peas was obtained when compositions containing S,S-dimethyl-N-(p-aminophenylsulfonyl)-sulfilimine as the sole toxicant therein were poured over the soil in separate seed beds in an amount sufficient to provide a toxicant concentration equivalent to 50 pounds per acre, and the separate seed beds thus treated were subsequently planted with viable seeds of soybeans and peas and held for observation. In other operations, excellent kills of soybeans and peas were obtained when separate compositions containing S,S - dimethyl-N-[p-(sulfinylamino)-phenylsulfonyl]-sulfilimine as the sole toxicant therein were poured over separate seed beds in an amount sufficient to provide a toxicant concentration equivalent to 50 pounds per acre, and the separate seed beds so treated were subsequently planted with viable seeds of soybeans and peas and held for observation.

The novel compounds are also useful for the control of bacteria. In representative operations, a group of ten mice was infected with *Streptococcus pyogenes* by intraperitoneal injection of a suspension of *Streptococcus pyogenes*. On each of three consecutive days following the infection, the mice were treated by the oral administration of S,S-dimethyl-N-(p-aminophenylsulfonyl)-sulfilimine in a vehicle consisting of sterile water and 10 percent gum acacia to provide the test compound at a dosage rate of 500 milligrams per kilogram. A similar group of mice was similarly infected with *Streptococcus pyogenes* but was not treated wtih a substituted sulfilimine compound to serve as a check. One hundred percent of the mice treated with S,S-dimethyl-N-(p-aminophenylsulfonyl)-sulfilimine were alive and healthy at the end of the test period, while all of the mice in the check group had died.

I claim:
1. An S,S-dialkyl-N-[p-(substituted)-phenylsulfonyl]-sulfilimine compound corresponding to the formula

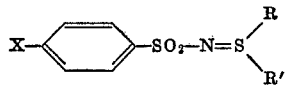

wherein R and R' each independently represent a lower alkyl group containing from 1 to 4 carbon atoms, inclusive, and X represents a member of the group consisting of amino and sulfinylamino.

2. A compound of claim 1 wherein R and R' both represent methyl.

3. A compound of claim 1 wherein X represents amino.

4. A compound of claim 1 wherein X represents sulfinylamino.

References Cited

Petranek, et al.: Chem. Abs., 54, 4271–2 (April 1960).

HENRY R. JILES, Primary Examiner

C. M. SHURKO, Assistant Examiner

U.S. Cl. X.R.

71—103; 260—999; 424—228